United States Patent
Liu et al.

(10) Patent No.: US 12,389,329 B2
(45) Date of Patent: Aug. 12, 2025

(54) SIDELINK COMMUNICATION WITH REDUCED POWER CONSUMPTION

(71) Applicant: NOKIA TECHNOLOGIES OY, Espoo (FI)

(72) Inventors: Yong Liu, Shanghai (CN); Dong Li, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 434 days.

(21) Appl. No.: 18/000,271

(22) PCT Filed: Jun. 12, 2020

(86) PCT No.: PCT/CN2020/095902
§ 371 (c)(1),
(2) Date: Nov. 29, 2022

(87) PCT Pub. No.: WO2021/248476
PCT Pub. Date: Dec. 16, 2021

(65) Prior Publication Data
US 2023/0209468 A1    Jun. 29, 2023

(51) Int. Cl.
*H04W 52/02* (2009.01)
*H04W 72/1263* (2023.01)
*H04W 72/25* (2023.01)

(52) U.S. Cl.
CPC ... *H04W 52/0225* (2013.01); *H04W 72/1263* (2013.01); *H04W 72/25* (2023.01)

(58) Field of Classification Search
CPC ......... H04W 52/0225; H04W 72/1263; H04W 72/25; H04W 52/241; Y02D 30/70;
(Continued)

(56) References Cited

U.S. PATENT DOCUMENTS 8,965,446 B2 *  2/2015  Kwon .................. H04W 52/04
                                                        455/522
10,904,065 B2 *  1/2021  Kim .................. H04W 72/0446
(Continued)

FOREIGN PATENT DOCUMENTS

CN    109526247 A    3/2019
CN    111147202 A    5/2020
(Continued)

OTHER PUBLICATIONS

3GPP TSG-RAN WG2 Meeting #109-e, R2-2002316; "Introduction of 5G V2X with NR Sidelink", 38.321 CR 0701; Rev 1; Current Version: 15.8.0; Online; Feb. 24-Mar. 6, 2020, 36 pages. (Year: 2020).*

(Continued)

*Primary Examiner* — Ayaz R Sheikh
*Assistant Examiner* — Louis Samara
(74) *Attorney, Agent, or Firm* — Barta Jones, PLLC

(57) ABSTRACT

Example embodiments relate to sidelink communication with reduced power consumption. In an embodiment, a terminal device may comprise at least one processor and at least one memory including computer program code. The at least one memory and the computer program code may be configured to, with the at least one processor, cause the terminal device to monitor sidelink transmission during a monitoring time-interval of a transmission period, and ignore a re-transmission time-interval subsequent to the monitoring time-interval in the transmission period in a case where no sidelink transmission to the terminal device is received in the monitoring time-interval.

7 Claims, 13 Drawing Sheets

(58) Field of Classification Search
CPC ..... H04L 1/1887; H04L 1/189; H04L 5/0044; H04B 7/0695

See application file for complete search history.

(56) References Cited

U.S. PATENT DOCUMENTS

| | | | |
|---|---|---|---|
| 11,601,893 B2* | 3/2023 | Bai | H04W 52/241 |
| 2014/0126468 A1 | 5/2014 | Filgueiras et al. | |
| 2017/0289733 A1 | 10/2017 | Rajagopal et al. | |
| 2017/0332358 A1* | 11/2017 | Park | H04W 72/23 |
| 2018/0035435 A1 | 2/2018 | Gupta et al. | |
| 2019/0081743 A1 | 3/2019 | Loehr et al. | |
| 2019/0090250 A1 | 3/2019 | Lee et al. | |
| 2019/0090300 A1 | 3/2019 | Xu | |
| 2019/0132818 A1 | 5/2019 | Yasukawa et al. | |
| 2019/0200352 A1 | 6/2019 | Hosseini et al. | |
| 2019/0239203 A1 | 8/2019 | Chae | |
| 2020/0275458 A1* | 8/2020 | Khoryaev | H04W 72/25 |
| 2020/0374860 A1* | 11/2020 | Panteleev | H04L 5/0044 |
| 2022/0039076 A1* | 2/2022 | Choi | H04B 7/0695 |
| 2024/0292425 A1* | 8/2024 | Dudda | H04L 47/78 |

FOREIGN PATENT DOCUMENTS

| | | | | |
|---|---|---|---|---|
| JP | 2013038496 A | | 2/2013 | |
| JP | 2023523224 A | * | 6/2023 | |
| WO | WO-2016104848 A1 | * | 6/2016 | |
| WO | WO-2016104849 A1 | * | 6/2016 | |
| WO | WO-2018143850 A1 | * | 8/2018 | .......... H04B 7/2637 |
| WO | 2019157739 A1 | | 8/2019 | |
| WO | 2020/068252 A1 | | 4/2020 | |
| WO | WO-2020209656 A1 | * | 10/2020 | .......... H04L 1/1812 |
| WO | WO-2023011350 A1 | * | 2/2023 | |

OTHER PUBLICATIONS

Office Action received for corresponding Chinese Patent Application No. 202080101941.8, dated Nov. 30, 2024, 10 pages of Office Action and no page of translation available.

"New WID on NR sidelink enhancement", 3GPP TSG RAN Meeting #86, RP-193231, Agenda Item: 9.1.1, LG Electronics, Dec. 9-12, 2019, 6 pages.

"3rd Generation Partnership Project; Technical Specification Group Radio Access Network; Study on further enhancements to LTE Device to Device (D2D), User Equipment (UE) to network relays for Internet of Things (IoT) and wearables; (Release 15)", 3GPP TR 36.746, V15.1.1, Apr. 2018, pp. 1-55.

"DRX Cycle adaptation for NR UE power saving", 3GPP TSG RAN WG1 Meeting AH-1901, R1-1901806, Agenda Item: 7.2.9.4, MediaTek Inc., Feb. 25-Mar. 1, 2019, 14 pages.

Office Action received for corresponding Chinese Patent Application No. 202080101941.8, dated Jun. 17, 2024, 11 pages of Office Action and no page of translation available.

International Search Report and Written Opinion for International Application No. PCT/CN2020/095902, mailed on Mar. 10, 2021, 8 pages.

3GPP TSG-RAN WG2 Meeting #109-e, R2-2002316; "Introduction of 5G V2X with NR Sidelink", 38.321 CR 0701; Rev 1; Current Version: 15.8.0; Online; Feb. 24-Mar. 6, 2020, 36 pages.

3GPP TSG-RAN WG2 Meeting #109-e, R2-2001969; "Introduction of 5G V2X with NR Sidelink", Source to WG: LG Electronics Inc.; Source to TSG: R2; Online; Feb. 24-Mar. 6, 2020, 37 pages.

3GPP TSG RAN WG1 Meeting #99, R1-1912028; "Support of NR Uu Controlling LTE Sidelink", Source: Vivo; Agenda Item: 7.2.4.7; Reno, Nevada, USA; Nov. 18-22, 2019; 8 pages.

* cited by examiner

SIDELINK COMMUNICATION WITH REDUCED POWER CONSUMPTION

CROSS-REFERENCE TO RELATED APPLICATIONS

This application is a national stage entry of International Application No. PCT/CN2020/095902, filed Jun. 12, 2020, entitled "SIDELINK COMMUNICATION WITH REDUCED POWER CONSUMPTION" which is hereby incorporated by reference in its entirety.

TECHNICAL FIELD

Exemplary embodiments described herein generally relate to communication technologies, and more particularly, to wireless communication devices, methods and systems for sidelink communication with reduced power consumption.

BACKGROUND

Certain abbreviations that may be found in the description and/or in the figures are herewith defined as follows:

| | |
|---|---|
| D2D | Device-to-Device |
| gNB | 5G Node-B |
| LTE | Long Term Evolution |
| MAC | Medium Access Control |
| NR | New Radio |
| PS | Public Safety |
| PSCCH | Physical Sidelink Control Channel |
| PSFCH | Physical Sidelink Feedback Channel |
| PSSCH | Physical Sidelink Shared Channel |
| RLC | Radio Link Control |
| UE | User Equipment |
| V2X | Vehicle-to-Everything |
| VOIP | Voice over IP |

Sidelink was firstly introduced in 3GPP Rel. 12 as an LTE feature for enabling device-to-device (D2D) communications, and it continuously evolved in Rels. 13/14/15 for various applications especially in vehicle-to-everything (V2X) scenarios. The first standard for NR based sidelink was established in Rel. 16, which also focused on V2X.

Recently, enhancement to NR sidelink has been proposed with an aim of extending NR sidelink usage to public safety and commercial use cases. Since these use cases have requirements and traffic characteristics quite different from those in V2X, corresponding enhancements are needed on the top of NR V2X sidelink specified in Rel. 16. For example, in the public safety use cases, UEs are usually sensitive to energy consumption, and an efficient power saving mechanism is particularly desirable.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a network device is provided. The network device may comprise at least one processor and at least one memory including computer program code. The at least one memory and the computer program code may be configured to, with the at least one processor, cause the network device to configure a terminal device with transmission periods for sidelink communication. The transmission periods may individually comprise a monitoring time-interval for at least a first transmission of a data packet and a re-transmission time-interval subsequent to the monitoring time-interval for a re-transmission of the data packet.

In a second aspect, an example embodiment of a terminal device is provided. The terminal device may comprise at least one processor and at least one memory including computer program code. The at least one memory and the computer program code may be configured to, with the at least one processor, cause the terminal device to transmit a first transmission of a data packet to a receiving terminal device during a monitoring time-interval in a transmission period, and to transmit subsequent transmissions of the data packet to the receiving terminal device during the monitoring time-interval and/or a re-transmission time-interval subsequent to the monitoring time-interval in the transmission period.

In a third aspect, an example embodiment of a terminal device is provided. The terminal device may comprise at least one processor and at least one memory including computer program code. The at least one memory and the computer program code may be configured to, with the at least one processor, cause the terminal device to monitor sidelink transmission during a monitoring time-interval of a transmission period, and to ignore a re-transmission time-interval subsequent to the monitoring time-interval in the transmission period in a case where no sidelink transmission to the terminal device is received in the monitoring time-interval.

In a fourth aspect, an example embodiment of a method implemented at a network device is provided. The method may comprise configuring a terminal device with transmission periods for sidelink communication. The transmission periods may individually comprise a monitoring time-interval for at least a first transmission of a data packet and a re-transmission time-interval subsequent to the monitoring time-interval for a re-transmission of the data packet.

In a fifth aspect, an example embodiment of a method implemented at a terminal device is provided. The method may comprise transmitting a first transmission of a data packet to a receiving terminal device during a monitoring time-interval in a transmission period, and transmitting subsequent transmissions of the data packet to the receiving terminal device during the monitoring time-interval and/or a re-transmission time-interval subsequent to the monitoring time-interval in the transmission period.

In a sixth aspect, an example embodiment of a method implemented at a terminal device is provided. The method may comprise monitoring sidelink transmission during a monitoring time-interval of a transmission period, and ignoring a re-transmission time-interval subsequent to the monitoring time-interval in the transmission period in a case where no sidelink transmission to the terminal device is received in the monitoring time-interval.

In a seventh aspect, an example embodiment of a computer program product is provided. The computer program product may be embodied in at least one computer readable medium and comprise instructions. The instructions may, when executed by at least one processor in a network device, cause the network device to configure a terminal device with transmission periods for sidelink communication. The transmission periods may individually comprise a monitoring time-interval for at least a first transmission of a data packet, and a re-transmission time-interval subsequent to the monitoring time-interval for a re-transmission of the data packet.

In an eighth aspect, an example embodiment of a computer program product is provided. The computer program product may be embodied in at least one computer readable medium and comprise instructions. The instructions may, when executed by at least one processor in a terminal device, cause the terminal device to transmit a first transmission of a data packet to a receiving terminal device during a monitoring time-interval in a transmission period, and to transmit subsequent transmissions of the data packet to the receiving terminal device during the monitoring time-interval and/or a re-transmission time-interval subsequent to the monitoring time-interval in the transmission period.

In a ninth aspect, an example embodiment of a computer program product is provided. The computer program product may be embodied in at least one computer readable medium and comprise instructions. The instructions may, when executed by at least one processor in a terminal device, cause the terminal device to monitor sidelink transmission during a monitoring time-interval of a transmission period, and to ignore a re-transmission time-interval subsequent to the monitoring time-interval in the transmission period in a case where no sidelink transmission to the terminal device is received in the monitoring time-interval.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Figure 1:
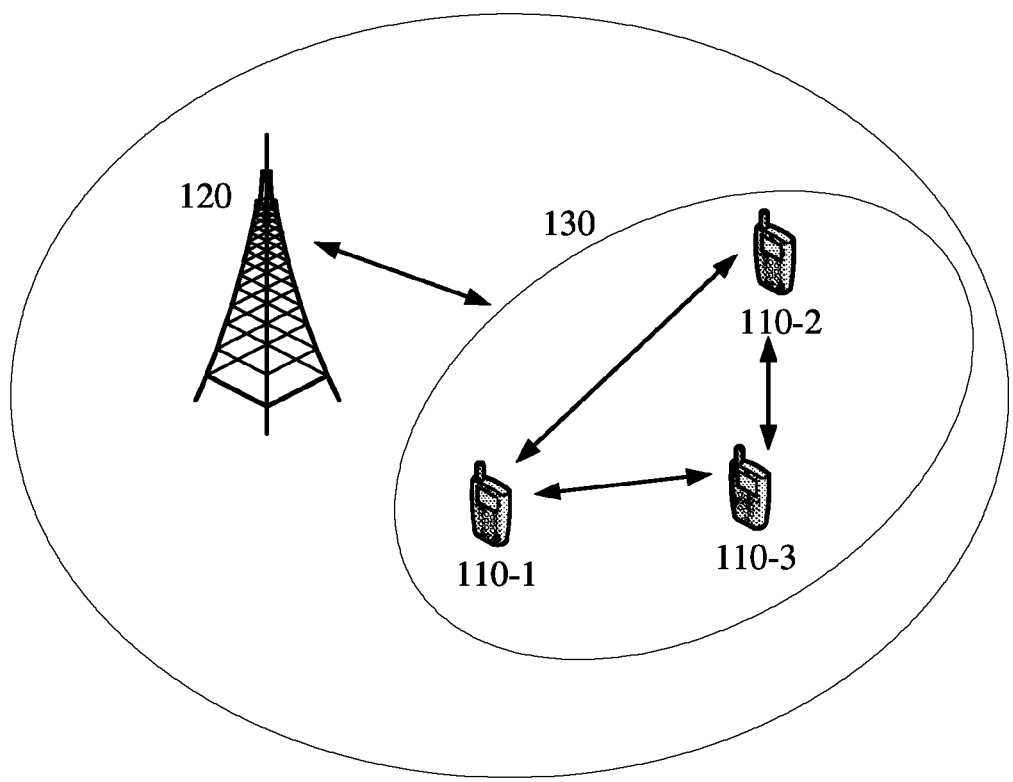
FIG. 1 illustrates a schematic diagram of an example communication system in which embodiments of the present disclosure can be implemented.

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which the terminal device can access the network or receive services. The network device may be commonly referred to as a base station. The term "base station" used herein can represent a node B (NodeB or NB), an evolved node B (eNodeB or eNB), or a gNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture.

As used herein, the term "terminal device" or "user equipment" (UE) refers to any entities or devices that can wirelessly communicate with the network devices or with each other. Examples of the terminal device can include a mobile phone, a mobile terminal (MT), a mobile station (MS), a subscriber station (SS), a portable subscriber station (PSS), an access terminal (AT), a computer, a wearable device, an on-vehicle communication device, a machine type communication (MTC) device, a D2D communication device, a V2X communication device, a sensor and the like. The term "terminal device" can be used interchangeably with a UE, a user terminal, a mobile terminal, a mobile station, or a wireless device.

As used herein, the term "circuitry" may refer to one or more or all of the following: (a) hardware-only circuit implementations (such as implementations in only analog and/or digital circuitry); and (b) combinations of hardware circuits and software, such as (as applicable): (i) a combination of analog and/or digital hardware circuits(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and/or processors(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in the present disclosure, the term "circuitry" also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The term "include" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least a further embodiment." Definitions related to other terms will be described in the following description.

FIG. 1 illustrates a schematic diagram of an example communication system 100 in which exemplary embodiments of the present disclosure can be implemented. Referring to FIG. 1, the communication system 100, which is a part of a communication network, includes a network device 120 and a plurality of terminal devices (hereinafter "UE") 110-1, 110-2, 110-3 (collectively referred to as "UE 110") in a group 130. The network device 120 may communicate with the UEs 110 on uplink (UL), downlink (DL) and/or supplementary uplink (SUL), and the UEs 110-1, 110-2, 110-3 may communicate with each other on sidelink. It would be understood that the UE group 130 may include a different number of UEs, for example 2, 4, 5 or more UEs, and the communication system 100 may include a different number of network devices, and/or a different number of terminal devices, and/or a different number of UE groups. For example, the communication system 100 may include a police public safety (PS) UE group and a fireman PS UE group, and an UE may belong to one or both of the groups. For sidelink communication between UEs, each UE 110 may act as a transmitting device sending sidelink transmissions to another UE(s), and as a receiving device receiving sidelink transmissions from another UE(s). Any one of the UEs 110 in the group 130 may also act as a group leader which periodically transmits and/or receives data to/from group members, or the group 130 may not include a group leader. For the sake of concision and clarity, herein below the terminal device 120 is described as a gNB, the UE 110-1 is described as a transmitting UE, the UE 110-2 as a receiving UE, and the UE 110-3 as an additional UE, but it would be appreciated that embodiments are not limited in any way thereto.

It would be understood that some embodiments may be implemented when the UEs 110 are within coverage of the network device 120 as shown in FIG. 1, some embodiments may be implemented when the UEs 110 are out of coverage of the network device 120, and some embodiments may also be implemented when some of the UEs 110 are within coverage of the network device 120 and the rest of the UEs 110 are out of coverage of the network device 120.

In public safety and commercial use scenarios, UEs are usually more energy sensitive than on-vehicle devices. According to a power consumption model revealed in 3GPP TR 36.746, UE in a receiving state consumes 40 to 100 times more power than that in a sleep or idle state. In the receiving state, UE needs to perform blind decoding of a physical sidelink control channel (PSCCH) in each slot of a sidelink resource pool for the UE so as not to miss any packet of interest. Blind decoding operations consume substantially amount of power. Therefore, it would be desirable to reduce inefficient blind decoding and put UE more in the sleep or idle state in order to decrease power consumption.

Figure 2:
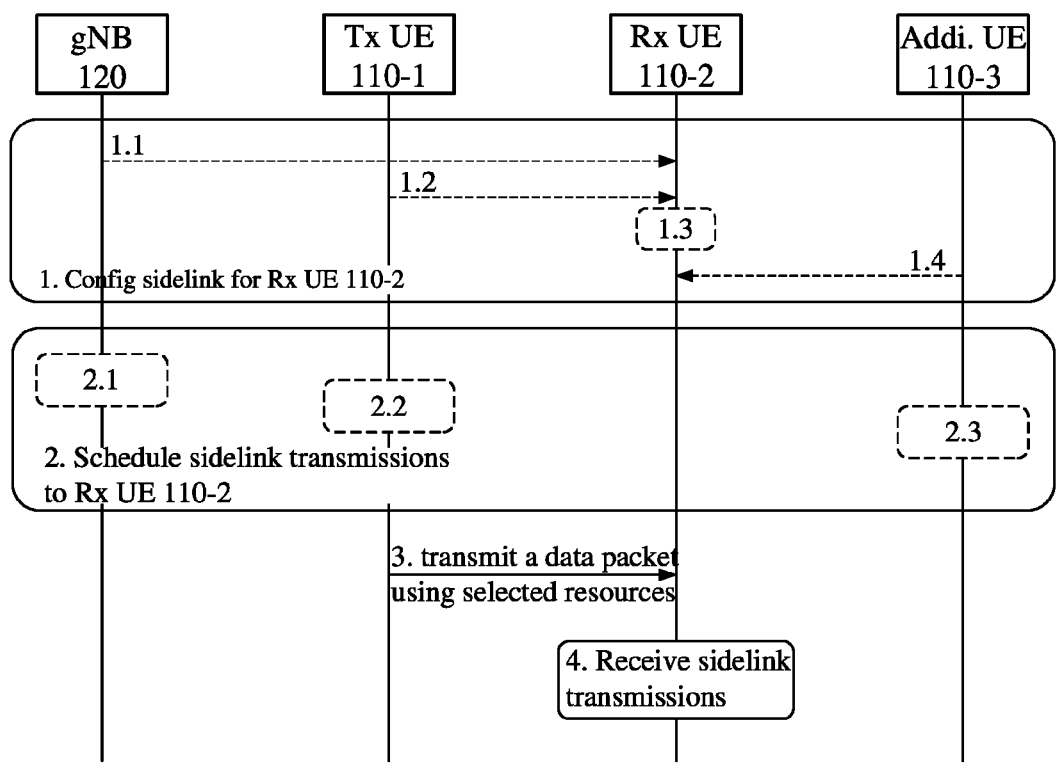
FIG. 2 illustrates an interaction diagram of operations for sidelink communication according to some embodiments of the present disclosure.

FIG. 2 illustrates an interaction diagram of operations for sidelink communication according to some embodiments of the present disclosure. The process shown in FIG. 2 can decrease power consumption of a receiving UE for sidelink communication while it would not cause missing of any sidelink transmission to the receiving UE. Referring to FIG. 2, at Block 1, an operation of configuring sidelink for the receiving UE 110-2 is performed. The operation may be performed at the gNB 120 as shown by a dashed arrow 1.1, at the transmitting (Tx) UE 110-1 as shown by a dashed arrow 1.2, at the receiving (Rx) UE 110-2 itself as shown by a dashed block 1.3, or at the additional UE 110-3 as shown by a dashed arrow 1.4. In some embodiments, the additional UE 110-3 may act as a leader UE in the group 130 comprising the UEs 110-1, 110-2 and 110-3. When sidelink for the Rx UE 110-2 is configured by the Tx UE 110-1, the Rx UE 110-2 itself or the additional UE 110-3, they may also report the sidelink configuration of the Rx UE 110-2 to the gNB 120.

Figure 3:
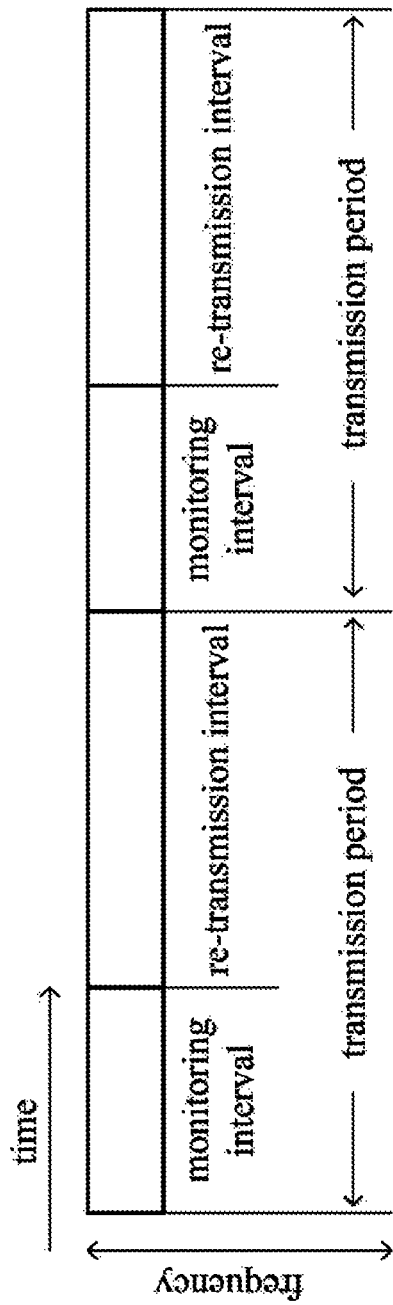
FIG. 3 illustrates a schematic diagram of sidelink configuration for a receiving terminal device according to some embodiments of the present disclosure.

In particular, at the operation 1, the Rx UE 110-2 may be configured with transmission periods for sidelink communication, of which an example is shown in FIG. 3. Referring to FIG. 3, the transmission periods for sidelink communication each may include a monitoring interval and a re-transmission interval subsequent to the monitoring interval in the time domain. The monitoring interval may include one or more slots for at least a first transmission of a data packet to the Rx UE 110-2, and the re-transmission interval may include one or more slots for re-transmissions of the data packet to the Rx UE 110-2. It would be understood that slots for the transmission periods may be selected from a resource pool assigned to the Rx UE 110-2.

In some embodiments, first m transmissions of the data packet to the Rx UE 110-2 may be transmitted during the monitoring interval, and remaining n transmissions of the data packet may be transmitted during the re-transmission interval, where m is an integer equal to or greater than one, and n is an integer equal to or greater than zero. The numbers m, n may be configured to the Rx UE 110-2 by for example a first parameter m and a second parameter n, respectively. The number m may be determined depending on quality of the channel between the Tx UE 110-1 and the Rx UE 110-2. If the channel quality is good, m may have a small value; if the channel quality is poor, m may have a large value.

In some embodiments, the Rx UE 110-2 may be configured with identical monitoring intervals as other UEs in the same service group 130. For instance, UEs used by policemen belong to a police public safety (PS) group and they are configured with identical monitoring intervals (or transmission periods) so that each UE in the police PS group can receive sidelink transmissions from other UEs in the group; UEs used by firemen belong to a fire brigade PS group and they are configured with identical monitoring intervals (or transmission periods) so that each UE in the fire brigade PS group can receive sidelink transmissions from other UEs in the group. The monitoring intervals for the police PS group may not overlap with the monitoring intervals for the fire brigade PS group since UEs in the police PS group do not need to receive transmissions from UEs in the fire brigade PS group. In some embodiments, identical monitoring intervals may be configured for both the police PS group and the fire brigade PS group to facilitate inter-department communications.

In some embodiments, a size of the monitoring interval may be determined based on transmitter density, the number m, channel busy ratio (CBR), and/or resource selection methods. For example, if many Tx UEs are sending data to the Rx UE 110-2, the number m has a large value, and/or the channel is busy, the monitoring interval may be configured with a large size. For another example, the monitoring interval may be configured with a larger size in a case of random resource selection than in a case of sensing-based resource selection.

In some embodiments, a size of the transmission period may be determined based on services provided by the sidelink communication. For instance, in a public safety use scenario, the most important service needed to be supported is VOIP (voice-over-IP), and a voice codec typically delivers a VoIP packet per 20 ms. Hence a suitable choice for the transmission period may be 20 ms or multiple times of 20 ms such as 40 ms, 60 ms, etc., as long as it is shorter than a latency requirement for the sidelink communication.

Figure 4:
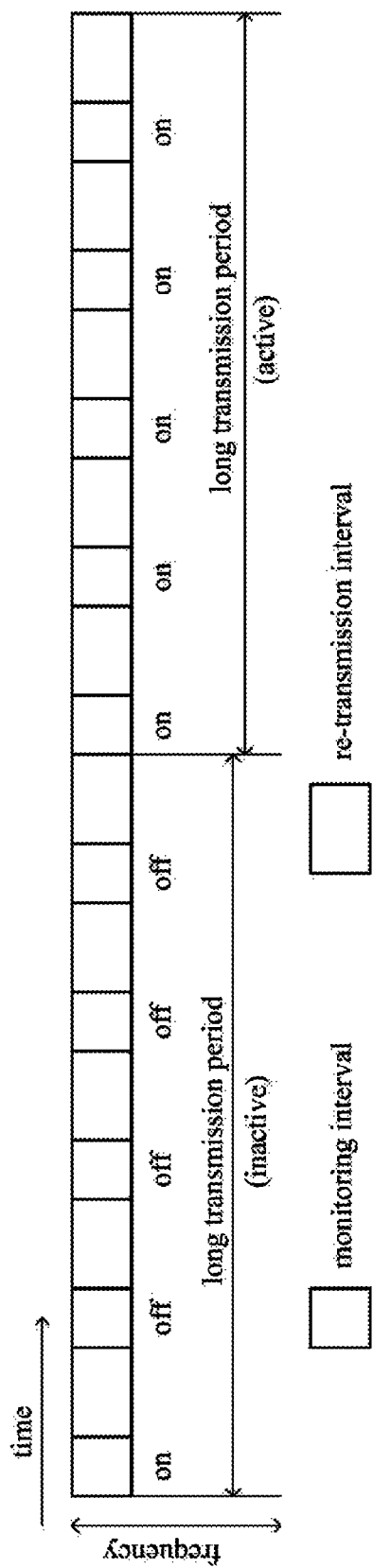
FIG. 4 illustrates a schematic diagram of sidelink configuration for a receiving terminal device according to some embodiments of the present disclosure.

FIG. 4 shows another example of the sidelink configuration for the Rx UE 110-2 according to some embodiments of the present disclosure, in which multiple consecutive transmission periods shown in FIG. 3 are configured as a long period. For instance, 5 transmission periods are configured as a long period in FIG. 4, and each long period includes 5 monitoring intervals and 5 re-transmission intervals. It would be understood that more or less transmission periods may be configured as a long period, as long as the long period is shorter than a latency requirement for the sidelink communication. For instance, when the transmission period is 20 ms, the long period of FIG. 4 has a size of 100 ms, which is shorter than a typical end-to-end latency requirement for the VOIP service, i.e., 200 ms.

The long period may be inactive or active. The Rx UE 110-2 always monitors the first monitoring interval of a long period to determine if the long period is active or inactive. If no sidelink transmission is scheduled for the Rx UE 110-2 in the first monitoring interval, the Rx UE 110-2 determines that the long period is inactive and then it does not need to monitor subsequent monitoring intervals in the long period. On the other hand, if at least one sidelink transmission is scheduled for the Rx UE 110-2 in the first monitoring interval, the Rx UE 110-2 determines that the long period is active and it keeps monitoring every monitoring interval in the long period.

Referring back to FIG. 2, at Block 2, sidelink transmissions are scheduled for the Rx UE 110-2 when the Tx UE 110-1 has a data packet to be transmitted to the Rx UE 110-2. For example, when a Media Access Control layer of the Tx UE 110-1 receives from a higher layer a packet data unit (PDU) to be transmitted to the Rx UE 110-2, the Tx UE 110-1 needs to schedule resources for transmissions of the data packet. In some embodiments, sidelink transmissions to the Rx UE 110-2 may be scheduled by the gNB 120, as shown by a dashed block 2.1. For instance, the Tx UE 110-1 may send a scheduling request to the gNB 120 informing that it has one or more data packets to be transmitted to the Rx UE 110-2. Then, the gNB 120 will select available resources for transmissions of the data packets and send a scheduling grant carried in Downlink Control Information (DCI) to the Tx UE 110-1 informing the resource selection. In some embodiments, the sidelink transmissions to the Rx UE 110-2 may be scheduled by the additional UE 110-3, as shown by a dashed block 2.3. Similar to the gNB 120, the additional UE 110-3 may inform the Tx UE 110-1 of resource selection carried in a PSSCH or a Sidelink Control Information (SCI). In some embodiments, the sidelink transmissions to the Rx UE 110-2 may be scheduled by the Tx UE 110-1 itself, as shown by a dashed block 2.2. Various resource selection methods may be applied, including but not limited to random resource selection or sensing-based resource selection. For the sensing-based resource selection, the Tx UE 110-1 may sense status of control and data channels used by transmitting UEs and select available resources for transmissions to the Rx UE 110-2.

Figure 5A:
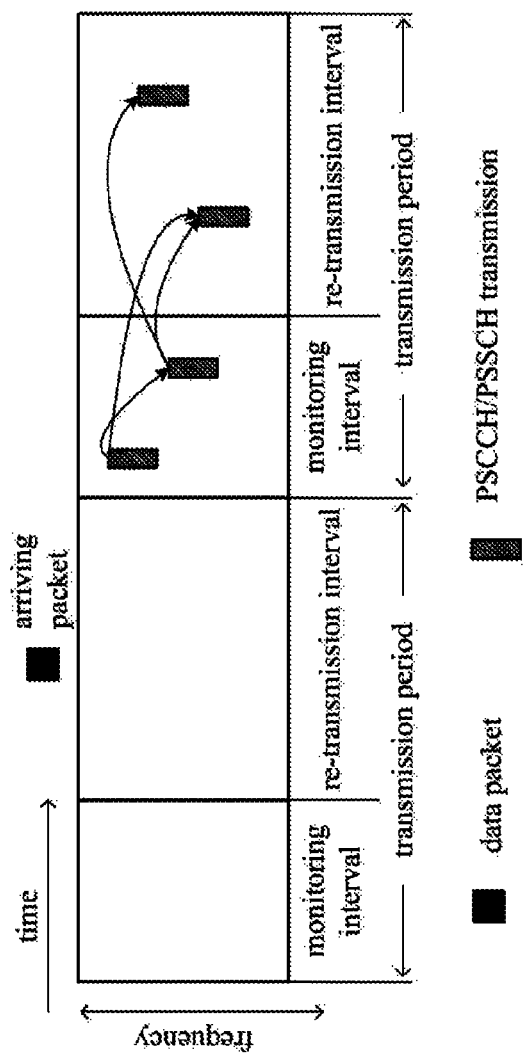
FIGS. 5A, 5B, 5C illustrate examples of resource selection for sidelink transmissions according to some embodiments of the present disclosure.
Figure 5B:
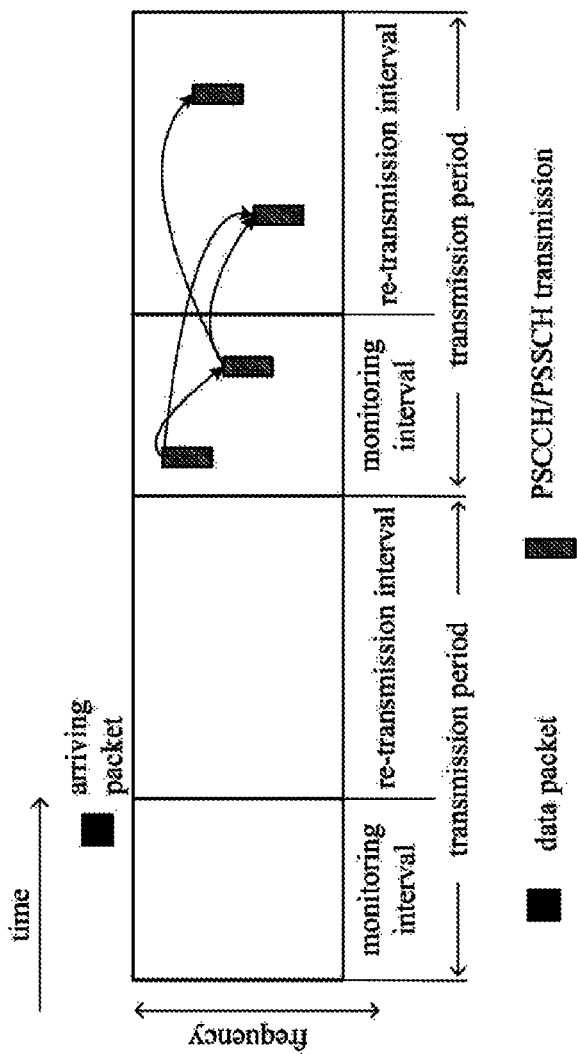
Figure 5C:
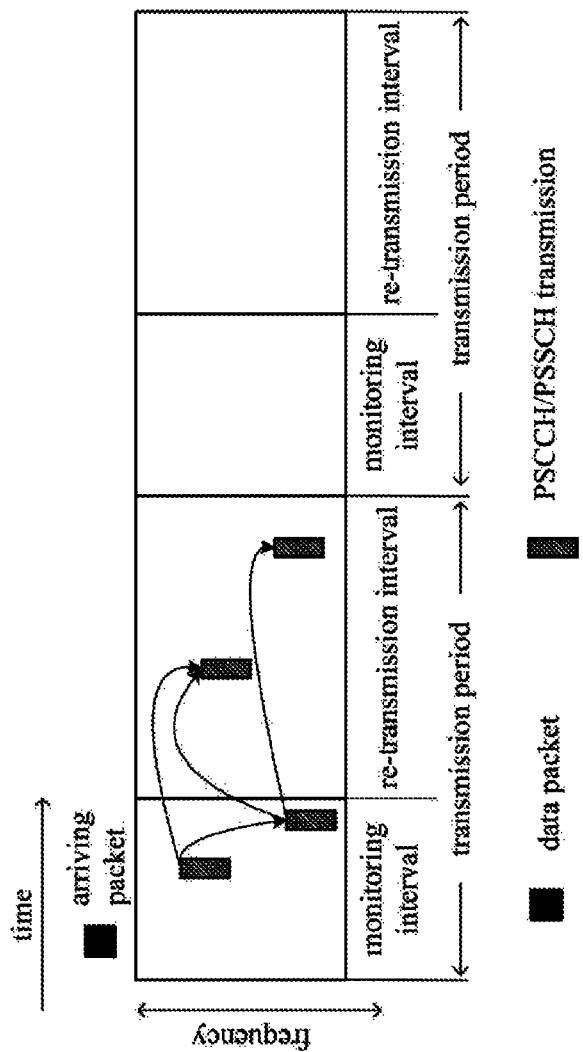

FIGS. 5A, 5B, 5C illustrate examples of resource selection for sidelink transmissions according to some embodiments of the present disclosure. As discussed above, the Rx UE 110-2 is configured with periodical monitoring and re-transmission intervals. When a data packet arrives, at least a first transmission of the data packet has to be scheduled during the monitoring interval, and subsequent transmissions of the data packet could be scheduled during the monitoring interval and/or the re-transmission interval.

FIG. 5A shows a case where a data packet to the Rx UE 110-2 arrives during a re-transmission interval. Referring to FIG. 5A, first two transmissions (m=2) of the data packet are scheduled during the next monitoring interval, and subsequent two transmissions (n=2) of the data packet are scheduled during the re-transmission interval corresponding to the monitoring interval for the first two transmissions. It would be understood that four transmissions of the data packet are shown merely by way of example, and more or less transmissions may be scheduled for the data packet. In addition, the numbers (m, n) of transmissions scheduled for the monitoring interval and the re-transmission interval may also vary depending on channel state between the Tx UE 110-1 and the Rx UE 110-2 and/or configuration of the communication system 100. For example, if the channel between the Tx UE 110-1 and the Rx UE 110-2 has good quality, the number (m) of transmissions scheduled during the monitoring interval may decrease to for example one, and the number (n) of transmissions scheduled during the re-transmission interval may increase to for example three. On the other hand, if the channel between the Tx UE 110-1 and the Rx UE 110-2 has poor quality, the number (m) of transmissions scheduled during the monitoring interval may increase to for example three, and the number (n) of transmissions scheduled during the re-transmission interval may decrease to for example one.

It would also be understood that the four transmissions of the data packet may be scheduled one by one. For example, when the Tx UE 110-1 sends the first transmission to the Rx UE 110-2, the Rx UE 110-2 may send a Hybrid Automatic Repeat reQuest (HARQ) feedback to the Tx UE 110-1 on a physical sidelink feedback channel (PSFCH). If the HARQ feedback is an Acknowledgement (ACK) indicating that the Rx UE 110-2 has successfully received the transmission, the Tx UE 110-1 would not schedule a re-transmission of the data packet to the Rx UE 110-2. Instead, the Tx UE 110-1 would flush its HARQ buffer and start a new transmission. On the other hand, if the HARQ feedback is a negative acknowledgement (NACK) indicating that the Rx UE 110-2 did not receive the transmission, the Tx UE 110-1 would schedule a re-transmission of the data packet to the Rx UE 110-2. The process may repeat until the Rx UE 110-2 successfully receives the data packet or the number of transmissions of the data packet reaches a predetermined maximum.

In some embodiments, resources for the four transmissions may also be determined at one time. For example, the gNB 120 (Block 2.1), the Tx UE 110-1 (Block 2.2) or the additional UE 110-3 (Block 2.3) may select resources for the four transmissions of the data packet at one time. In particular, resources for the first two transmissions are selected from the monitoring interval and resources for the subsequent two transmissions are selected from the re-transmission interval corresponding to the monitoring interval. Then, the Tx UE 110-1 will transmit the four transmissions using the selected resources, and the Rx UE 110-2 will send an HARQ feedback to the Tx UE 110-1 after the last transmission.

FIGS. 5B and 5C show cases where a data packet to the Rx UE 110-2 arrives during a monitoring interval. In some embodiments, as shown in FIG. 5B, resources for first m (m=2 in FIGS. 5A-5C) transmissions of the data packet may be selected from a next monitoring interval, but not from the current monitoring interval. In some embodiments, as shown in FIG. 5C, resources for first m transmissions of the data packet may be selected from the current monitoring interval. Resources for the subsequent n (n=2 in FIGS. 5A-5C) transmissions of the data packet may be selected from the re-transmission interval corresponding to the monitoring interval for the first m transmissions. Compared with the example shown in FIG. 5B, the example shown in FIG. 5C has a shorter latency, but it may increase collision probability of the transmissions. Hence, sensing-based resource selection is preferred. The sensing-based resource selection may be performed to check whether there are enough good transmission resources in the current monitoring interval. If not, the transmission resources may be selected from a next monitoring interval. It would also be understood that if the next monitoring interval shown in FIGS. 5A-5B do not have enough good transmission resources, the first m transmissions may be scheduled to a next monitoring interval.

Figure 6A:
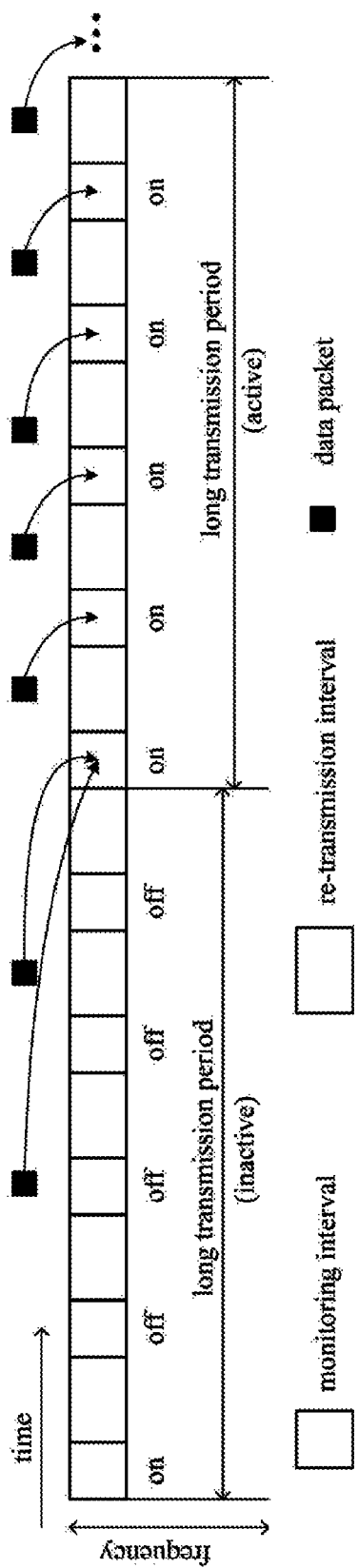
FIGS. 6A-6B illustrate examples of resource selection for sidelink transmissions according to some embodiments of the present disclosure.
Figure 6B:
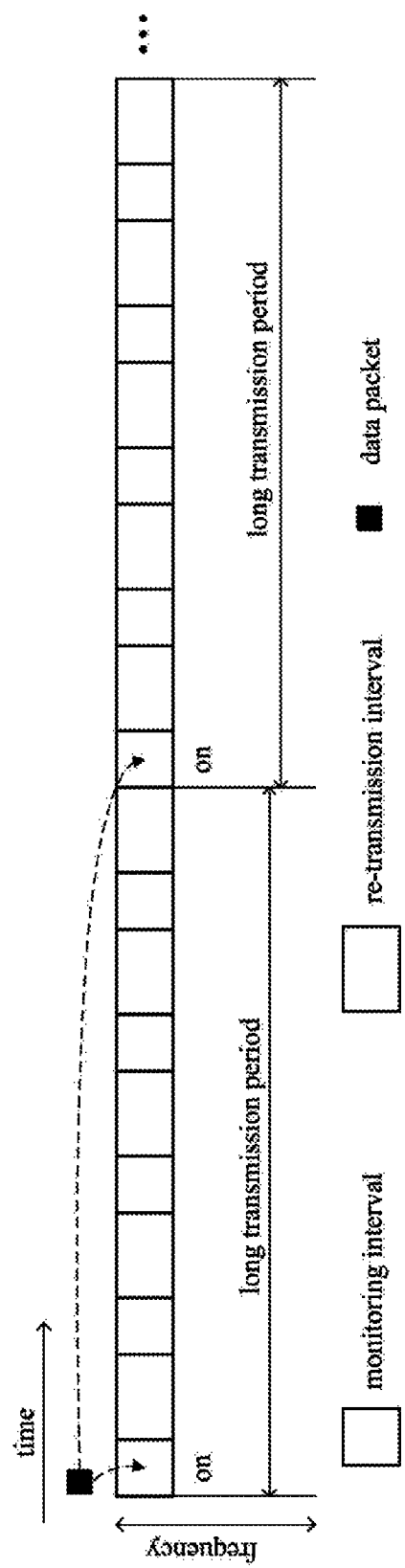

FIGS. 6A-6B illustrate other examples of resource selection for sidelink transmissions according to some embodiments of the present disclosure. In the examples of FIGS. 6A-6B, the Rx UE 110-2 is configured with long transmission periods as shown in FIG. 4, and each long period comprises multiple (5 in FIGS. 4, 6A-6B) transmission periods shown in FIG. 3. Referring to FIG. 6A, when one or more (2 shown in FIG. 6A) data packets to the Rx UE 110-2 arrive at an inactivate long period in which no transmission to the Rx UE 110-2 was scheduled for the first monitoring interval of the inactivate long period, first m transmissions of at least one of the one or more data packets are scheduled during the first monitoring interval of the next long period. That is to say, the next long period would be an active long period. If the first monitoring interval of the next long period has enough good transmission resources, all of the one or more data packets arrived during the preceding inactive long period may have their first m transmissions scheduled during the first monitoring interval of the next long period. When a data packet to the Rx UE 110-2 arrives during the active long period in which the first monitoring interval is scheduled for transmissions to the Rx UE 110-2, first m transmissions of the data packet would be scheduled during a current or next available monitoring interval, either in the current long period or in a next long period. Although not shown in FIG. 6A, subsequent n transmissions of each data packet would be scheduled during the re-transmission interval corresponding to the monitoring interval for the first m transmissions of the data packet.

FIG. 6B shows a case where a data packet arrives during a first monitoring interval of a long transmission period (the first long period in FIG. 6B) in which no transmission to the Rx UE 110-2 has been scheduled during the first monitoring interval of the long transmission period. In some embodiments, a first transmission of the data packet may be scheduled during the first monitoring interval of the long transmission period. Thus, the long transmission period becomes an active long period, and the Rx UE 110-2 will monitor each monitoring interval in the active long period. In some embodiments, the first transmission of the data packet may also be scheduled during a first monitoring time-interval of a next long transmission period. Thus, the current long transmission period becomes inactive, while the next long transmission period becomes active.

Referring back to FIG. 2, at Operation 3, the Tx UE 110-1 transmits the data packet to the Rx UE 110-2 using the resources selected in Operation 2, and at Operation 4, the Rx UE 110-2 receives the sidelink transmissions. In particular, the Rx UE 110-2 monitors a monitoring interval of a transmission period. For example, the Rx UE 110-2 performs blind decoding of a physical sidelink control channel (PSCCH) in each slot of the monitoring interval and may further try to decode a corresponding physical sidelink shared channel (PSSCH) based on the decoded PSCCH. If a PSCCH part of one or more transmissions of a data packet to the Rx UE 110-2 is correctly received/decoded during the monitoring interval and a corresponding PSSCH part of the transmissions of the data packet is not correctly received/decoded, the Rx UE 110-2 will further decode subsequent transmission(s) of the data packet at resources in the corresponding re-transmission interval indicated in the previous transmission(s) of the data packet. In some embodiments, the Rx UE 110-2 may decode subsequent transmission(s) of the data packet at resources in the corresponding re-transmission interval indicated in the previous transmission(s) of the data packet if the PSCCH part of the previous transmission(s) is correctly decoded and the decoding of the PSSCH part of the previous transmission(s) is not performed, and the Rx UE 110-2 may combine all the transmissions to determine the data packet, thereby improving reliability of the communication. Referring to FIGS. 5A-5C, a previous transmission may indicate resources of following two transmissions. Thus the Rx UE 110-2 may directly decode transmissions in the re-transmission interval, avoiding blind decoding of each slot in the re-transmission interval. If no transmission to the Rx UE 110-2 is received in the monitoring interval, or a transmission of a data packet to the Rx UE 110-2 is received in the monitoring interval and both the PSCCH part and the PSSCH part of the transmission are correctly decoded, the Rx UE 110-2 will ignore the re-transmission interval corresponding to the monitoring interval. In other words, the Rx UE 110-2 may be set in a sleep/idle mode with its receiver circuitry switched off. In this way, the Rx UE 110-2 may skip receiving/decoding the whole re-transmission interval or avoid receiving/decoding most slots in the re-transmission interval. Compared with a case of blind decoding all slots, the process of FIG. 2 allows for a significant reduction of power consumption for the sidelink communication.

When the Rx UE 110-2 is configured with long periods as shown in FIG. 4, it always monitors the first monitoring interval in each long period. The Rx UE 110-2 turns on its receiving circuitry in the first monitoring interval of each long period and receives/decodes PSCCHs/PSSCHs in the interval (see 'on' and 'off' indications in FIG. 4). If at least one transmission is received in the first monitoring interval of the long period, the Rx UE 110-2 considers this long period active and keeps monitoring each subsequent monitoring interval in the long period (as for the second long transmission period in FIG. 4). If no transmission is received in the first monitoring interval of the long period, the Rx UE 110-2 considers this long period inactive and ignores all subsequent transmission periods in the long period (as for the first long transmission period in FIG. 4). This receiving mechanism can further reduce power consumption of the Rx UE 110-2 since there are substantial amount of silence time between talk spurts of VoIP data traffic, and it can also meet the latency requirement for the VOIP service.

Figure 7:
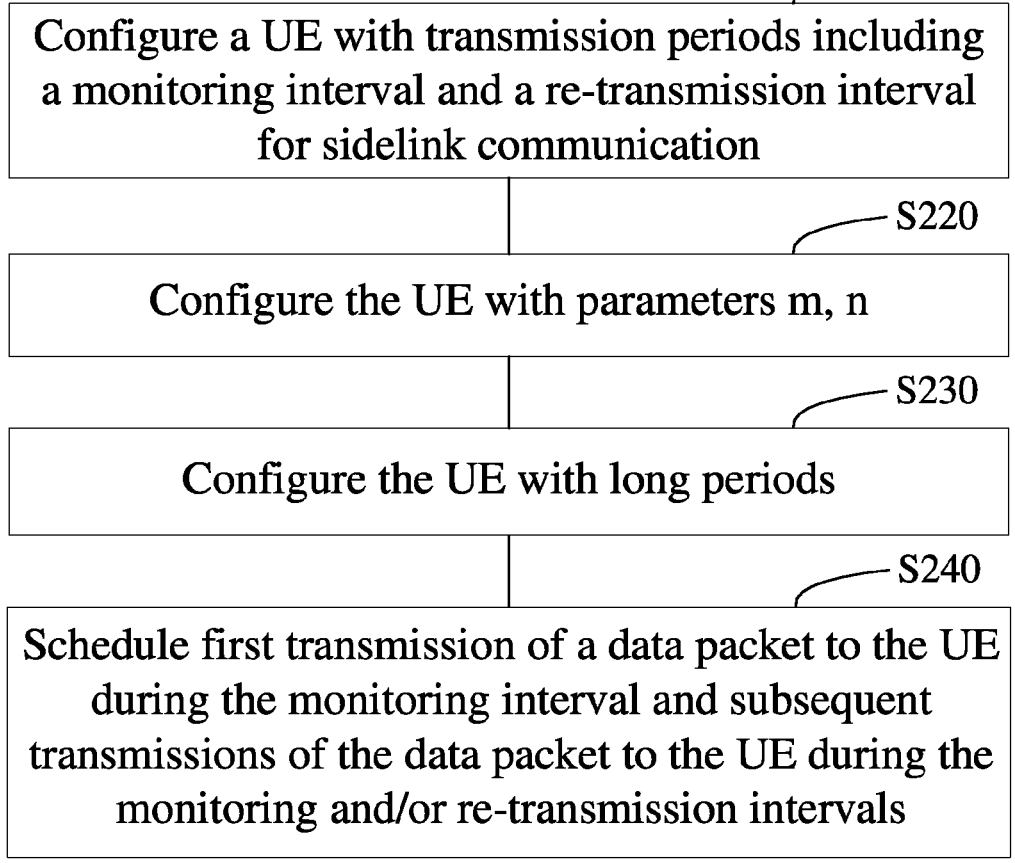
FIG. 7 illustrates a flow chart of a method implemented at a network device for sidelink communication according to some embodiments of the present disclosure.

FIG. 7 illustrates a flow chart of a method 200 implemented at a network device for example the gNB 120 for sidelink communication according to some embodiments of the present disclosure. Referring to FIG. 7, the method 200 may comprise a step S210 of configuring a terminal device (for example, the Rx UE 110-2) with transmission periods for sidelink communication. As discussed above with reference to FIG. 3, the transmission period may comprise a monitoring interval for at least a first transmission of a data packet to the Rx UE 110-2 and a re-transmission interval subsequent to the monitoring interval for a re-transmission of the data packet.

In some embodiments, optionally, the method 200 may further comprise a step S220 of configuring the Rx UE 110-2 with parameters m, n. The first parameter m indicates that first m transmissions of the data packet to the Rx UE 110-2 would be scheduled during the monitoring interval, and the second parameter n indicates that subsequent n transmissions of the data packet would be scheduled during the re-transmission interval subsequent to the monitoring interval.

In some embodiments, optionally, the method 200 may further comprise a step S230 of configuring the Rx UE 110-2 with long periods, each including a plurality of transmission periods described above.

In some embodiments, optionally, the method 200 may further comprise a step S240 of scheduling a first transmission of a data packet to the Rx UE 110-2 during the monitoring interval of a transmission period and subsequent transmissions of the data packet to the Rx UE 110-2 during the monitoring interval and/or the re-transmission interval of the transmission period. For example, if the Rx UE 110-2 is configured with the first and second parameters m, n, first m transmissions of the data packet may be scheduled during the monitoring interval, and subsequent n transmissions of the data packet may be scheduled during the re-transmission interval subsequent to the monitoring interval. In some embodiments where the Rx UE 110-2 is configured with long periods as shown in FIG. 4, if the data packet arrives during an inactive long period in which no transmission to the Rx UE 110-2 was scheduled for the first monitoring interval of the long period, the first transmission of the data packet may be scheduled during the first monitoring interval in a next long period. If the data packet arrives during an active long period in which at least one transmission to the Rx UE 110-2 was scheduled for the first monitoring interval of the long period, the first transmission of the data packet may be scheduled during a current or next available monitoring interval in either the current active long period or a next long period. If the data packet arrives during a first monitoring interval of a long transmission period, the first transmission of the data packet may be scheduled during the first monitoring interval of the current long transmission period or during a first monitoring interval of a next long transmission period. Subsequent transmissions of the data packet may be scheduled during the monitoring interval for the first transmission and/or the re-transmission interval corresponding to the monitoring interval.

Figure 8:
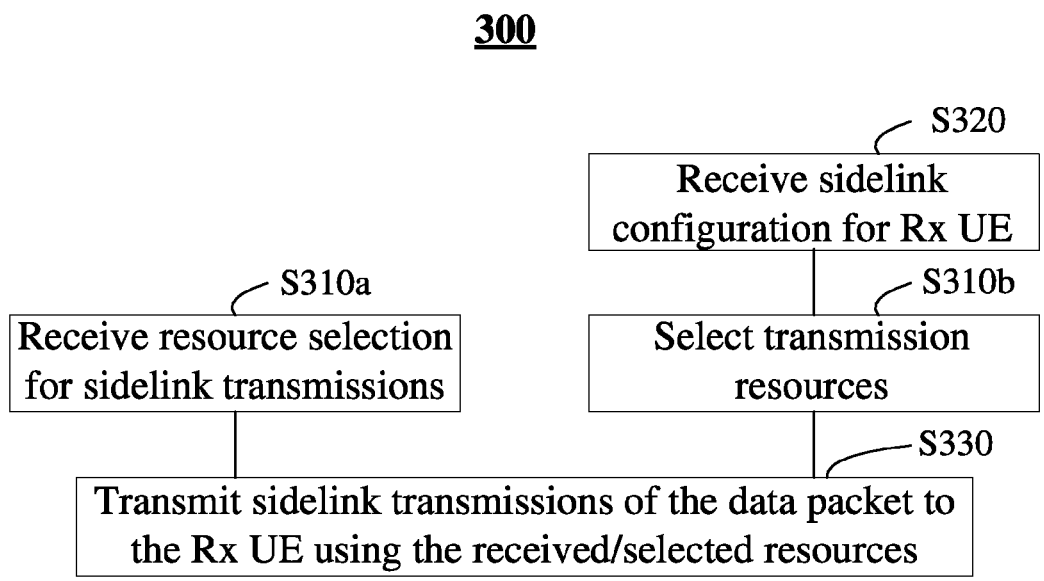
FIG. 8 illustrates a flow chart of a method implemented at a terminal device for sidelink communication according to some embodiments of the present disclosure.

FIG. 8 illustrates a flow chart of a method 300 implemented at a terminal device for example the Tx UE 110-1 for sidelink communication according to some embodiments of the present disclosure. Referring to FIG. 8, the method 300 may optionally comprise a step S310*a* of receiving resource selection for sidelink transmissions of a data packet to the Rx UE 110-2 from the gNB 120 or the additional UE 110-3, or a step S310*b* of selecting resources for transmissions of the data packet to the Rx UE 110-2. As discussed above, resources for the first transmission of the data packet to the Rx UE 110-2 may be selected from a monitoring interval of a transmission period, and resources for subsequent transmissions of the data packet to the Rx UE 110-2 may be selected from the monitoring interval and/or a subsequent re-transmission interval in the transmission period. In particular, when the data packet arrives during a monitoring interval, resources for the first transmission of the data packet may be selected from a current or next available monitoring interval. When the data packet arrives during a re-transmission interval, resources for the first transmission of the data packet may be selected from a next available monitoring interval. In some embodiments where the Rx UE 110-2 is configured with long periods as shown in FIG. 4, if the data packet arrives during an inactive long period in which no transmission to the Rx UE 110-2 was scheduled during the first monitoring interval of the long period, resources for the first transmission of the data packet may be selected from the first monitoring interval in a next long period. If the data packet arrives during an active long period in which at least one transmission to the Rx UE 110-2 was scheduled for the first monitoring interval of the long period, resources for the first transmission of the data packet may be selected from a current or next available monitoring interval in either the current active long period or a next long period. If the data packet arrives during a first monitoring interval of a long transmission period, resources for the first transmission of the data packet may be selected from the first monitoring interval of the current long transmission period or from a first monitoring interval of a next long transmission period. Resources for subsequent transmissions of the data packet may be selected from the monitoring interval for the first transmission and/or the re-transmission interval corresponding to the monitoring interval.

In some embodiments, before the step S310*b* of selecting resources for transmissions of the data packet, the method 300 may further comprise a step S320 of receiving sidelink configuration for the Rx UE 110-2 from the gNB 120, the Rx UE 110-2 or the additional UE 110-3. As discussed above, the sidelink configuration for the Rx UE 110-2 may comprise monitoring intervals, re-transmission intervals, transmission periods including the monitoring and re-transmission intervals, long periods including multiple transmission periods, and/or parameters m, n configured for the Rx UE 110-2.

Then at a step S330, transmissions of the data packet are transmitted to the Rx UE 110-2 by using the resource selection received from another device in the step S310*a* or determined at the Tx UE 110-2 in the step S310*b*. In particular, the first transmission of the data packet is transmitted during the monitoring interval, and subsequent transmissions of the data packet are transmitted during the monitoring interval and/or the re-transmission interval subsequent to the monitoring interval.

Figure 9:
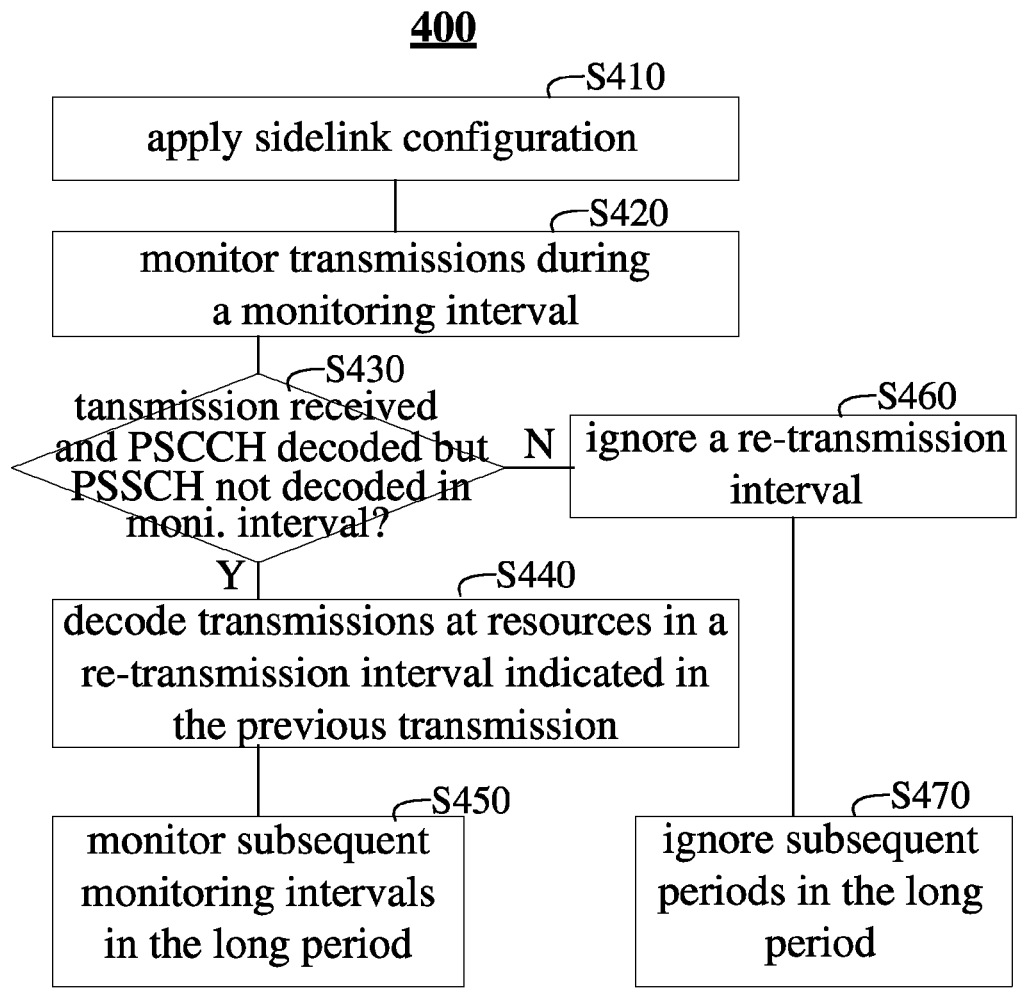
FIG. 9 illustrates a flow chart of a method implemented at a terminal device for sidelink communication according to some embodiments of the present disclosure.

FIG. 9 illustrates a flow chart of a method 400 implemented at a terminal device for example the Rx UE 110-2 for sidelink communication according to some embodiments of the present disclosure. Referring to FIG. 9, the method 400 may optionally comprise a step S410 of applying sidelink configuration at the Rx UE 110-2. The sidelink configuration may be received from another device for example the gNB 120, the Tx UE 110-1 or the additional UE 110-3, or it may be determined at the Rx UE 110-2. As discussed above, the sidelink configuration may comprise monitoring intervals, re-transmission intervals, transmission periods including the monitoring and re-transmission intervals, long periods including multiple transmission periods, and/or parameters m, n configured for the Rx UE 110-2.

Then at a step S420, the Rx UE 110-2 monitors sidelink transmissions during a monitoring interval of a transmission period. For example, the Rx UE 110-2 may perform blind decoding of a sidelink control channel in each slot of the monitoring interval. The Rx UE 110-2 may also decode a sidelink shared channel based on the decoded sidelink control channel.

If it is determined at a step S430 that at least one transmission of a data packet to the Rx UE 110-2 is received at the monitoring interval and a PSCCH part of the transmission is correctly decoded while a corresponding PSSCH part is not correctly decoded or the decoding of the corresponding PSSCH part is not performed, then at a step S440, the Rx UE 110-2 may monitor subsequent transmissions of the data packet in a re-transmission interval subsequent to the monitoring interval. For example, the Rx UE 110-2 may directly decode the subsequent transmissions at resources indicated in the previous transmissions received in the monitoring interval. Optionally, if the Rx UE 110-2 is configured with long periods and the monitoring interval monitored at the step S420 is a first monitoring interval in a long period, the method 400 may further comprise a step S450 of monitoring subsequent monitoring intervals in the long period.

If it is determined at the step S430 that no transmission to the Rx UE 110-2 is received during the monitoring interval, or a transmission of a data packet to the Rx UE 110-2 is received during the monitoring interval and both a PSCCH part and a PSSCH part of the transmission are correctly decoded, then at a step S460, the Rx UE 110-2 will ignore a re-transmission interval subsequent to the monitoring interval in the transmission period. For example, the Rx UE 110-2 may switch off its receiver circuitry to save power during the re-transmission interval. Optionally, if the Rx UE 110-2 is configured with long periods and the monitoring interval monitored at the step S420 is a first monitoring interval in a long period, the Rx UE 110-2 may further ignore subsequent transmission periods in the long period. For example, the Rx UE 110-2 may switch off its receiver circuitry to save power during all the monitoring intervals of the long period but the first, and during all the re-transmission intervals of the long period. It will further reduce power consumption for the sidelink communication.

The methods 200, 300, 400 are briefly described herein as details thereof have been described when discussing the operations shown in FIG. 2. It would be apparent that the description relating to the operations shown in FIG. 2 are also applicable to the methods 200, 300 and 400 discussed herein.

Figure 10:
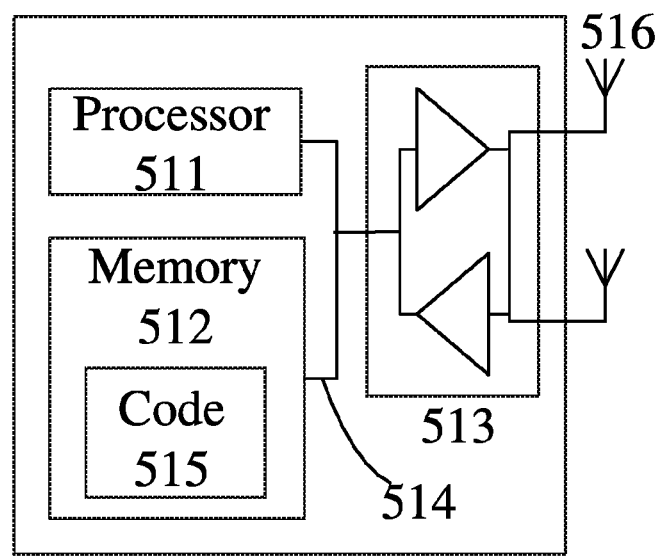
FIG. 10 illustrates a schematic block diagram of a device according to some embodiments of the present disclosure.

FIG. 10 illustrates a schematic block diagram of a device 500 according to some embodiments of the present disclosure. The device 500 may be implemented at the network device 120 or at any one of the UEs 110 to perform any one of the operations and/or methods discussed above.

Referring to FIG. 10, the device 500 may include one or more processors 511, one or more memories 512 and one or more transceivers 513 interconnected through one or more buses 514. The one or more buses 514 may be address, data, or control buses, and may include any interconnection mechanism such as series of lines on a motherboard or integrated circuit, fiber, optics or other optical communication equipment, and the like. Each of the one or more transceivers 513 may comprise a receiver and a transmitter, which are connected to one or more antennas 516. The device 500 may wirelessly communicate with other devices through the one or more antennas 516. For example, the device 500 may be implemented at a terminal device and it may communicate with other terminal devices on sidelinks and/or with one or more network devices on uplinks and downlinks. The one or more memories 512 may include computer program code 515. The one or more memories 512 and the computer program code 515 may be configured to, when executed by the one or more processors 511, cause the device 500 to perform operations and/or methods as described above.

The one or more processors 511 may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 511 may be configured to control other elements of the UE/network device and operate in cooperation with them to implement the procedures discussed above.

The one or more memories 512 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 512 may include but not limited to an electric, a magnetic, an optical, an electromagnetic, an infrared, or a semiconductor system, apparatus, or device or any combination of the above.

It would be understood that blocks shown in FIGS. 1-10 may be implemented in various manners, including software, hardware, firmware, or any combination thereof. In some embodiments, one or more blocks may be implemented using software and/or firmware, for example, machine-executable instructions stored in the storage medium. In addition to or instead of machine-executable instructions, parts or all of the blocks in FIGS. 1-10 may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some exemplary embodiments further provide computer program code or instructions which, when executed by one or more processors, may cause a device or apparatus to perform the procedures described above. The computer program code for carrying out procedures of the exemplary embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some exemplary embodiments further provide a computer program product embodied in a computer readable medium comprising the computer program code or instructions. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

The invention claimed is:

1. A terminal device comprising:
at least one processor; and
at least one memory including computer program code, the at least one memory and the computer program code configured to, with the at least one processor, cause the terminal device to:
apply sidelink configuration at the terminal device, the sidelink configuration being determined by the following: a network device, a transmitting terminal device sending the sidelink transmission to the terminal device, an additional terminal device in sidelink communication with the terminal device, wherein the sidelink configuration indicates a monitoring time-interval, a re-transmission time-interval; a transmission period including the monitoring time-interval and the re-transmission time-interval; a long transmission period including a plurality of transmission periods; a first parameter m indicating that first m transmissions of a data packet are allowed to be transmitted to the terminal device during the monitoring time-interval, where the first parameter m is an integer equal to or greater than one; and a second parameter n indicating that subsequent n transmissions of the data packet are allowed to be transmitted to the terminal device during the re-transmission time-interval, where the second parameter n is an integer equal to or greater than zero;
monitor sidelink transmission during the monitoring time-interval of the transmission period;
determine that a control channel part of one or more transmissions of the data packet to the terminal device is correctly received during the monitoring time-interval and a corresponding data channel part is correctly received during the monitoring time-interval; and
based on determining that the control channel part of the one or more transmissions of the data packet to the terminal device is correctly received during the monitoring time-interval and the corresponding data channel part is correctly received during the monitoring time-interval;
ignore the re-transmission time-interval subsequent to the monitoring time-interval; and
ignore subsequent period in the long transmission period.

2. The terminal device of claim 1 wherein monitoring sidelink transmission during a monitoring time-interval comprises performing blind decoding of a sidelink control channel in the monitoring time-interval.

3. The terminal device of claim 2, wherein the at least one memory and the computer program code are further configured to, with the at least one processor, cause the terminal device to:
apply a second sidelink configuration at the terminal device;
based on the second sidelink configuration, monitor sidelink transmission during a second monitoring time-interval of a second transmission period;
determine that a transmission of a second data packet to the terminal device is received at the second monitoring time-interval and a physical sidelink control channel (PSCCH) part of the transmission of the second data packet is correctly decoded while a corresponding physical sidelink shared channel (PSSCH) part is not correctly decoded; and
based on determining that the transmission of the second data packet to the terminal device is received at the second monitoring time-interval and the PSCCH part of the transmission of the second data packet is correctly decoded while the corresponding PSSCH part is not correctly decoded, monitor subsequent transmissions of the second data packet in a second re-transmission interval subsequent to the second monitoring interval.

4. A system comprising:
a terminal device;
at least one processor; and
at least one memory including computer program code, the at least one memory and the computer program code configured to, with the at least one processor, cause the terminal device to:
apply sidelink configuration at the terminal device, the sidelink configuration being determined by the following: a network device, a transmitting terminal device sending the sidelink transmission to the terminal device, an additional terminal device in sidelink communication with the terminal device, wherein the sidelink configuration indicates a monitoring time-interval, a re-transmission time-interval; a transmission period including the monitoring time-interval and the re-transmission time-interval; a long transmission period including a plurality of transmission periods; a first parameter m indicating that first m transmissions of a data packet are allowed to be transmitted to the terminal device during the monitoring time-interval, where the first parameter m is an integer equal to or greater than one; and a second parameter n indicating that subsequent n transmissions of the data packet are allowed to be transmitted to the terminal device during the re-transmission time-interval, where the second parameter n is an integer equal to or greater than zero;

monitor sidelink transmission during the monitoring time-interval of the transmission period;

determine that a control channel part of one or more transmissions of the data packet to the terminal device is correctly received during the monitoring time-interval and a corresponding data channel part is correctly received during the monitoring time-interval; and based on determining that the control channel part of the one or more transmissions of the data packet to the terminal device is correctly received during the monitoring time-interval and the corresponding data channel part is correctly received during the monitoring time-interval:

ignore the re-transmission time-interval subsequent to the monitoring time-interval; and ignore subsequent period in the long transmission period.

5. The system of claim 4, wherein the at least one memory and the computer program code are further configured to, with the at least one processor, cause the terminal device to:

apply a second sidelink configuration at the terminal device;

based on the second sidelink configuration, monitor sidelink transmission during a second monitoring time-interval of a second transmission period;

determine that a transmission of a second data packet to the terminal device is received at the second monitoring time-interval and a physical sidelink control channel (PSCCH) part of the transmission of the second data packet is correctly decoded while a corresponding physical sidelink shared channel (PSSCH) part is not correctly decoded; and based on determining that the transmission of the second data packet to the terminal device is received at the second monitoring time-interval and the PSCCH part of the transmission of the second data packet is correctly decoded while the corresponding PSSCH part is not correctly decoded, monitor subsequent transmissions of the second data packet in a second re-transmission interval subsequent to the second monitoring interval.

6. A method comprising:

applying, by a terminal device, sidelink configuration at the terminal device, the sidelink configuration being determined by the following: a network device, a transmitting terminal device sending the sidelink transmission to the terminal device, an additional terminal device in sidelink communication with the terminal device, wherein the sidelink configuration indicates a monitoring time-interval, a re-transmission time-interval; a transmission period including the monitoring time-interval and the re-transmission time-interval; a long transmission period including a plurality of transmission periods; a first parameter m indicating that first m transmissions of a data packet are allowed to be transmitted to the terminal device during the monitoring time-interval, where the first parameter m is an integer equal to or greater than one; and a second parameter n indicating that subsequent n transmissions of the data packet are allowed to be transmitted to the terminal device during the re-transmission time-interval, where the second parameter n is an integer equal to or greater than zero;

monitoring, by the terminal device, sidelink transmission during the monitoring time-interval of the transmission period;

determining, by the terminal device, that a control channel part of one or more transmissions of the data packet to the terminal device is correctly received during the monitoring time-interval and a corresponding data channel part is correctly received during the monitoring time-interval; and based on determining that the control channel part of the one or more transmissions of the data packet to the terminal device is correctly received during the monitoring time-interval and the corresponding data channel part is correctly received during the monitoring time-interval:

ignoring, by the terminal device, the re-transmission time-interval subsequent to the monitoring time-interval; and ignoring, by the terminal device, subsequent period in the long transmission period.

7. The method of claim 6, further comprising:

applying, by the terminal device, a second sidelink configuration at the terminal device;

based on the second sidelink configuration, monitor, by the terminal device, sidelink transmission during a second monitoring time-interval of a second transmission period;

determine, by the terminal device, that a transmission of a second data packet to the terminal device is received at the second monitoring time-interval and a physical sidelink control channel (PSCCH) part of the transmission of the second data packet is correctly decoded while a corresponding physical sidelink shared channel (PSSCH) part is not correctly decoded; and based on determining that the transmission of the second data packet to the terminal device is received at the second monitoring time-interval and the PSCCH part of the transmission of the second data packet is correctly decoded while the corresponding PSSCH part is not correctly decoded, monitor, by the terminal device, subsequent transmissions of the second data packet in a second re-transmission interval subsequent to the second monitoring interval.

\* \* \* \* \*